Figure 3A:
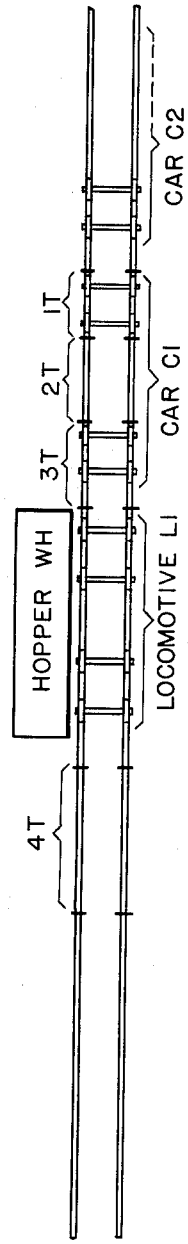

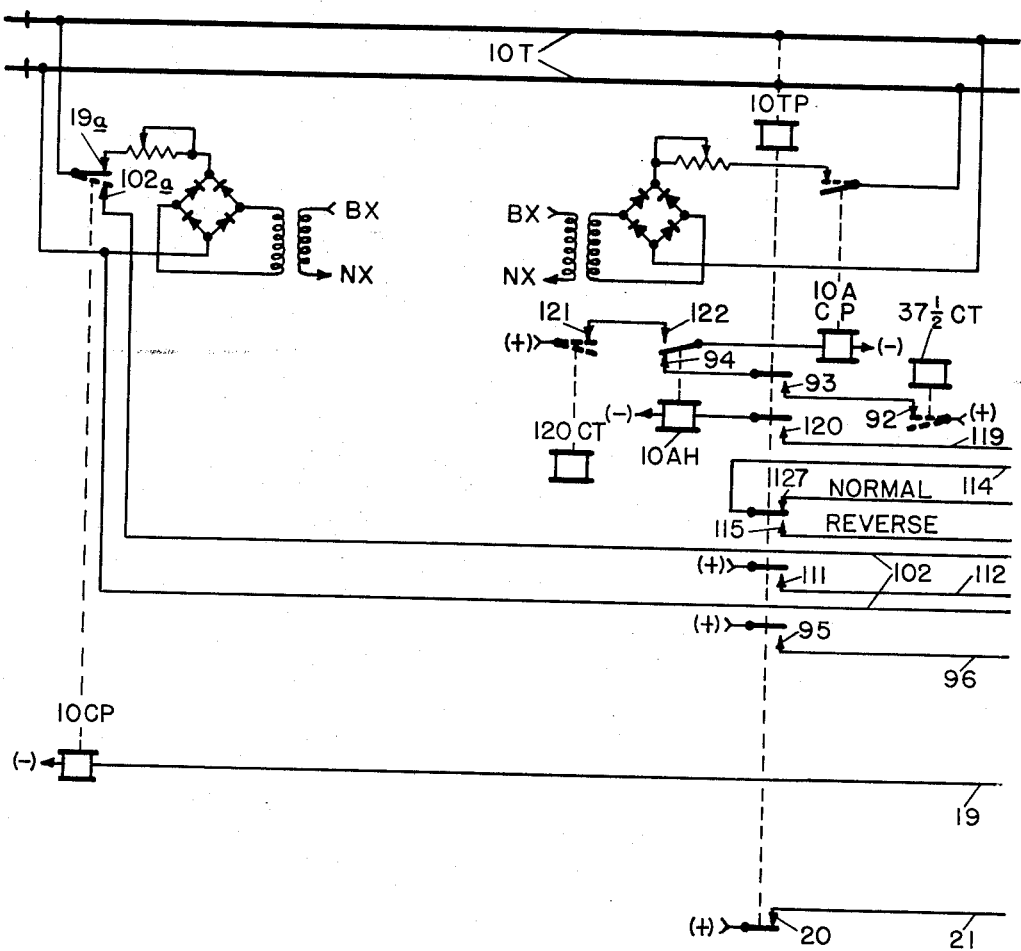

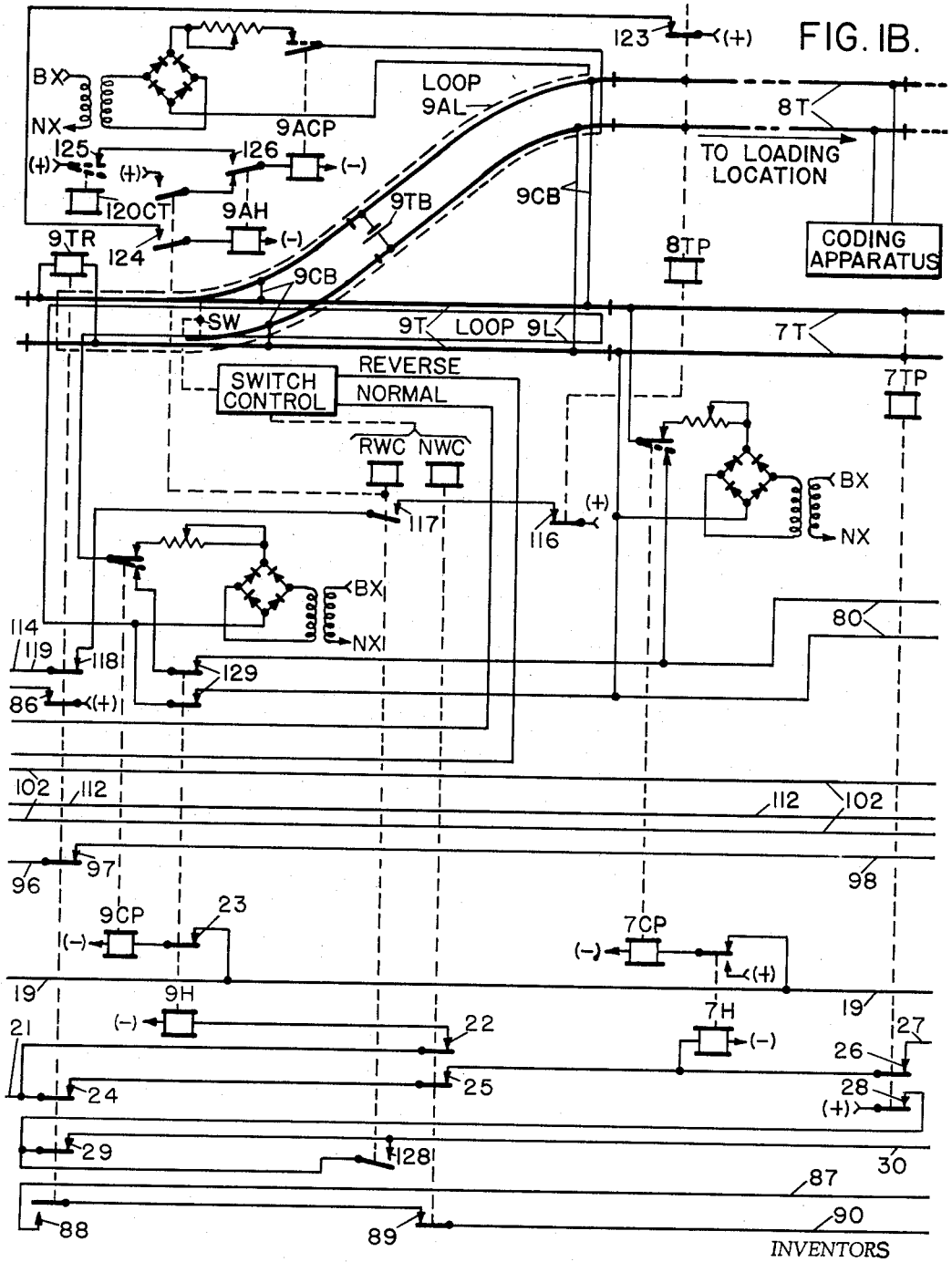
FIG. IB.
INVENTORS
G.W. DAVISON AND
G.O. FERM
BY Forest B. Hitchcock
THEIR ATTORNEY FIG.IC.
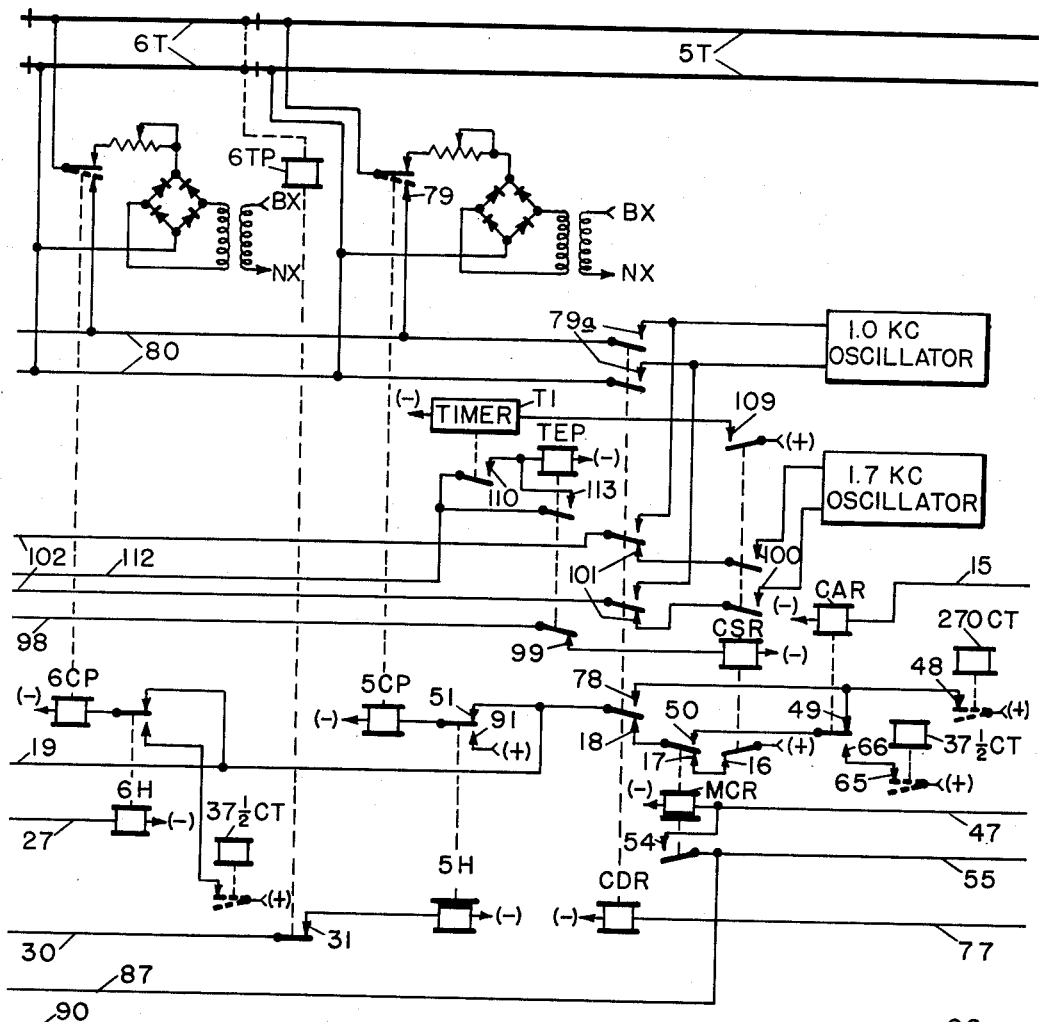

Oct. 26, 1965    G. W. DAVISON ETAL    3,214,038
CONTROL SYSTEM FOR RAILWAY VEHICLES
Filed March 5, 1962    6 Sheets-Sheet 4
FIG.ID.
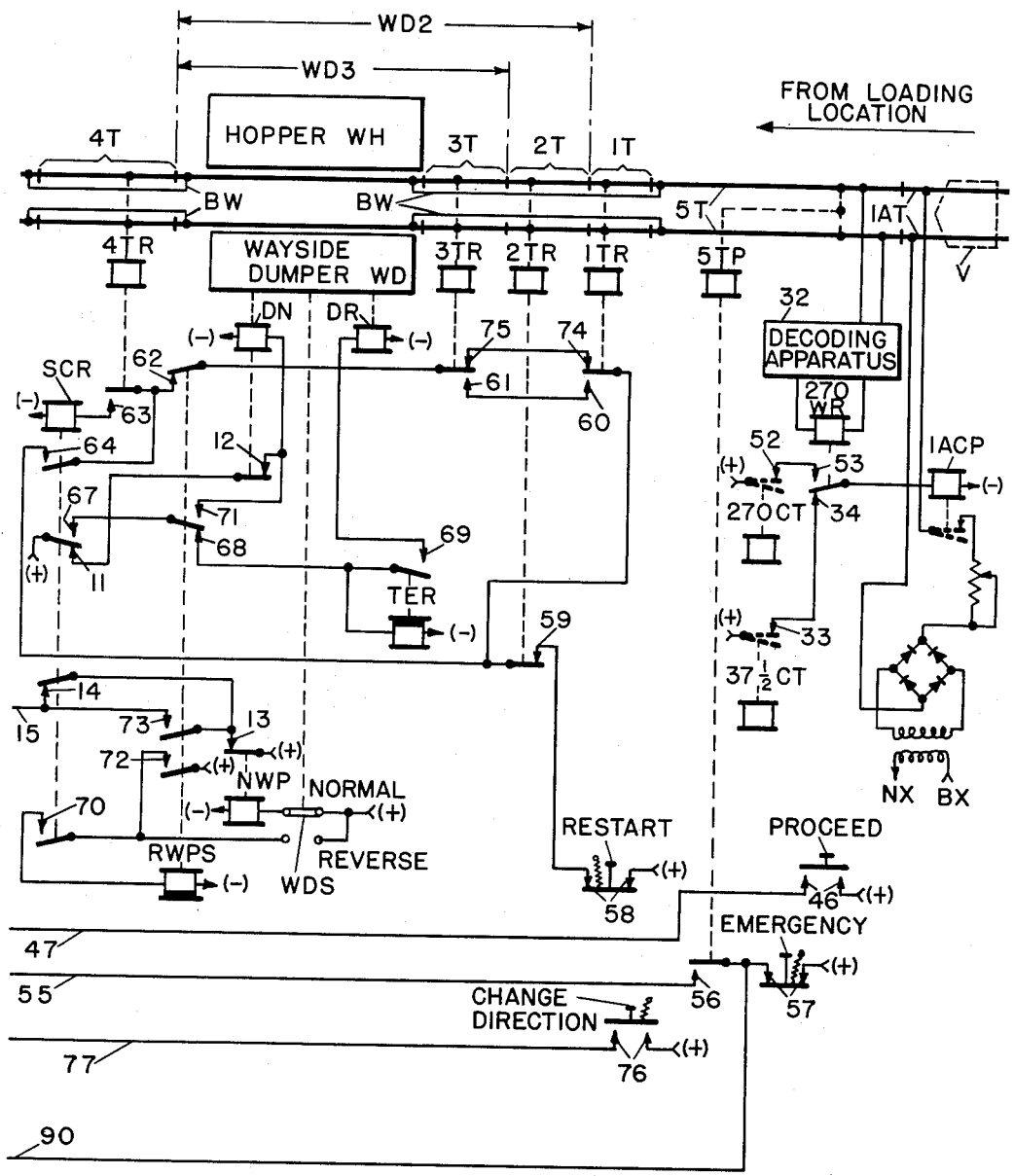
INVENTORS
G.W. DAVISON AND
BY   G.O. FERM
Forest B. Hitchcock
THEIR ATTORNEY

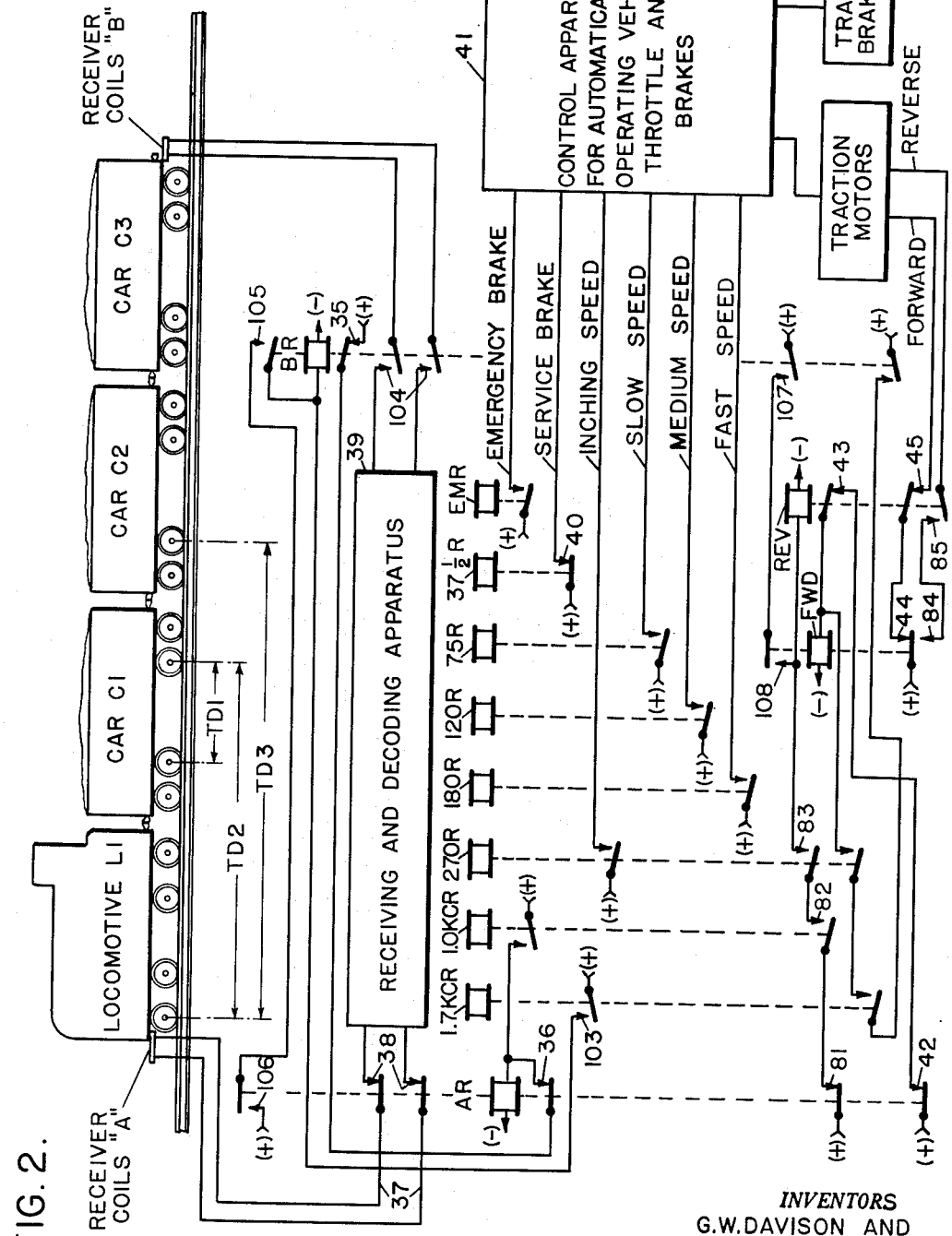

Oct. 26, 1965   G. W. DAVISON ETAL   3,214,038
CONTROL SYSTEM FOR RAILWAY VEHICLES
Filed March 5, 1962   6 Sheets-Sheet 6

*INVENTORS*
G.W. DAVISON AND
G.O. FERM
BY
THEIR ATTORNEY

United States Patent Office 3,214,038
Patented Oct. 26, 1965

3,214,038
CONTROL SYSTEM FOR RAILWAY VEHICLES
Gordon W. Davison and Glenn O. Ferm, Rochester, N.Y., assignors to General Signal Corporation, a corporation of New York
Filed Mar. 5, 1962, Ser. No. 177,318
17 Claims. (Cl. 214—64)

This invention generally relates to control systems for railway vehicles and more particularly pertains to a control system for governing the operation of dump trains during mining operation.

In the typical mining operation, the cars of the dump train are loaded at the mine loading location and the train is then dispatched to the mine dumping location where the individual cars of the train are to be successively spotted for dumping. Heretofore, this successive spotting of the loaded dump cars has been controlled by a dumping operator who visually determines when each of the cars is properly positioned at the dumping location before the car is dumped. Thus, during the operation of automatic dump trains which have their throttle and brake mechanisms selectively operated in accordance with coded control information communicated from the wayside to the train, the dumping operator controls the spotting of the successive cars by manually selecting the proper train control codes to be communicated from the wayside to the train and then causes the cars to be dumped by controlling the dumping mechanism, located either on the cars or on the wayside.

In order to relieve the dumping operator of having to visually spot and then dump each car, it is generally proposed in accordance with the present invention to provide a control system which will automatically spot and dump the successive cars of such an automatic dump train at a mine dumping location.

More specifically, it is proposed in accordance with the present invention to provide an automatic type system for alternately communicating start and stop codes to an automatic dump train, whereby each car to the train is successively spotted at a wayside dumping location and which provides automatic dumping means for dumping the individual cars of the train as these cars are successively spotted.

In the typical mining operation, after the entire train has been dumped, the empty train is then returned to the mine loading location for reloading. Normally, this return trip of the empty dump train includes a switchback operation of the train at a track switch located beyond the dumper, whereby the empty train is routed from the dumping track onto a track connected to the mine loading location, thus avoiding undesirable tie-up of the dumping location by an empty train.

It is therefore further proposed in accordance with the present invention to provide means whereby this switchback operation of a train, being controlled in accordance with coded control information communicated from the wayside, is performed automatically at the switching location.

More specifically, in the illustrated embodiment of the present invention, an automatic dump train, after being dumped, first operates over the track switch in a first or normal position, in accordance with coded control information communicated from the wayside to the train distinctive of the traffic conditions in advance of the train. After the train has cleared the switch in its first position, the track switch is automatically reversed to its second position, to align the switchback route to the mine loading location, and the train is automatically conditioned for the opposite direction of travel. After the track switch has been reversed, the train is then automatically operated back over the switch in accordance with the coded control information then communicated from the wayside to the train distinctive of traffic conditions along the switchback route.

In view of the above considerations, one object of the present invention is to provide for automatically controlling the alternate stopping and starting of a railway train for successively spotting each car of the train at a predetermined wayside location.

A further object of the present invention is to provide for automatically controlling the alternate stopping and starting of a railway train, being operated in accordance with coded control information communicated from the wayside to the train, by alternately communicating start and stop codes from the wayside to the train, whereby each car of the train is successively spotted at a predetermined wayside location.

A more specific object of the present invention is to provide for automatically and successively spotting and dumping each car of an automatic dump train at a wayside dumping location.

A further object of the present invention is to provide for the automatic switchback operation of a railway train being operated in accordance with coded control information communicated from the wayside to the train.

A more specific object of the present invention is to provide for the automatic switchback operation of an automatic train which has its throttle and brake mechanism selectively operated and its direction of travel selected by coded control information communicated from the wayside to the train.

Other objects, purposes and characteristic features of the present invention will be in part obvious from the accompanying drawings and in part pointed out as the description of the invention progresses.

In describing the invention in detail, reference will be made to the accompanying drawings in which:

FIGS. 1A through 1D, when placed side by side, illustrate a track layout typical of a dumping location in a mining operation;

FIG. 2 illustrates diagrammatically an automatic railway dump train and the apparatus carried on the train for automatically operating the vehicle throttle and brake mechanisms in accordance with coded control information communicated to the train from the wayside; and FIGS. 3A through 3D diagrammatically illustrate certain locations of the automatic railway train of FIG. 2 relative to the wayside dumping location.

In order to simplify the illustration of the drawings and facilitate in the explanation of the fundamental characteristics of the present invention, various parts and circuits have been shown diagrammatically in accordance with conventional symbols. Thus, arrows with associated symbols (+) and (—) are employed to indicate connections of circuits of the various relays to opposite terminals of a suitable source of direct current for energization of such relays, while arrows with associated symbols EX and NX are intended here to represent connections to the opposite terminals of a suitable source of alternating current of preselected frequency, such as, for example, one hundred cycles per second.

Referring now to FIGS. 1A through 1D, a track layout is illustrated which is typical of the dumping location in a railway mining operation. A stretch of single track, including track sections 5T, 6T, and 7T extends to the left from FIG. 1D to FIG. 1B and through a track switch SW to track section 10T of FIG. 1A. During normal dumping operation, the track switch SW is maintained in its illustrated "normal" position for permitting train movement from track section 7T onto track section 10T. However, when the track switch SW is reversed, as will be described, the track section 10T is connected to a stretch of track, including track section 8T of FIG. 1B, which extends to the mine loading location.

Referring now to FIG. 1D, a wayside dumping location is disposed along track section 5T and includes wayside dumper DW and wayside hopper WH. The car dumper can be, for example, of the general type disclosed in the General Railway Signal Company Bulletin No. 197, dated April, 1961. To the right of track section 5T, as viewed in FIG. 1D, is an approach track section 1AT which leads from the mine loading location.

Adjacent the wayside dumping location of FIG. 1D is a plurality of short track sections 1T, 2T, 3T, and 4T formed within track section 5T and the purpose of which will be discussed in detail hereinafter. Associated with each of these short track sections 1T through 4T is a track relay TR which is normally energized by a conventional track battery (not shown).

Referring now to FIG. 2, the illustrated automatic dump train has its throttle and brake mechanisms selectively operated and its direction of travel selected in accordance with coded control information or messages communicated from the wayside to the train. More specifically, in the illustrated embodiment of the present invention, this coded control information is normally of the current pulse rate code type of message transmitted along the trackway to the train for providing continuous control of the train in the illustrated track layout. Thus, certain coding apparatus, including code transmitters CT, are associated with track sections 5T through 10T for causing energization of the track rails or associated trackway loop circuits at preselected code rates.

The coded control information is received on the automatic dump train by receiver coils "A" and "B." More specifically, receiver coils "A" are mounted on locomotive L1 ahead of the leading wheels and when rendered effective, as will be discussed, receive the coded control information transmitted from left to right along the trackway, as viewed in FIGS. 1A through 1D, and supply the received messages as input to the train carried Receiving and Decoding Apparatus of FIG. 2; while receiver coils "B" are mounted on the last car C3, behind the rear wheels for receiving the coded control information transmitted from right to left along the trackway. As will be described in detail hereinafter, the automatic dump train of FIG. 2 is operated in accordance with the received coded control information, as shown in the following table:

Received control code:    Train operation
    STEADY code rate
        or no code_____  Emergency brake application.
    37½ code rate_____    Service brake application.
    75 code rate_____  Slow speed.
    120 code rate_____   Medium speed.
    180 code rate_____   Fast speed.
    270 code rate_____   Inching speed.
    1.0 KC + 270
        code rate_____  Reverse inching with "A" receiver coils in control.
    1.7 KC _____    Shift control from receiver coils "A" to receiver coils "B."

Referring to the accompanying drawings, the loaded mining trains approaching the wayside dumping location of FIG. 1D are stopped on approach track section 1AT due to a 37½ (SERVICE BRAKE) code rate normally applied to the left-hand end of track section 1AT. The dumping operator by depressing the PROCEED push button of FIG. 1D, causes a 270 code rate to be applied to track section 1AT, and thereby permits the loaded mining train waiting on track section 1AT to proceed, at inching speed, into the dumping location on track section 5T.

After the locomotive L1 of the automatic dump train has cleared the wayside dumper WD, the system of the present invention then automatically stops and starts the automatic train for successively spotting each of the connected dump cars over the wayside dumper WD. That is, the automatic train inches forward, from right to left in FIG. 1D, until the first car C1 is correctly positioned at the wayside dumper WD, at which time a stop control code is automatically communicated from the wayside to the train effective to cause a service brake application on the train for spotting the first car C1. The wayside dumper WD is then automatically controlled from its "normal" or non-dumping position to its 'reverse" or dumping position and therefore dumps the car C1. After the car C1 has been dumped, the dumper WD is automatically controlled to its "normal" position and a 270 proceed inching control code is then communicated to the train for moving the empty car from the wayside dumper WD. In other words, each car is temporarily spotted at the wayside dumper for a time interval which is predetermined in the sense that it begins after a stop control code is communicated to the train and ends with the return of the dumper to its normal or non-dumping position.

The train then proceeds until the following car C2 is properly located at the dumping location, at which time the train is once again stopped by a 37½ stop control code automatically communicated from the wayside to spot the second car C2 for dumping. Although the details of the dump car and wayside dumper WD are not shown in detail, it is assumed here that the dump cars are of that type having a car body pivotally mounted on the car truck with a latching mechanism to normally hold the car body in the illustrated "non-dumping" position, while the wayside dumper includes a suitable means for unlatching and dumping the car body when operated to its "reverse" or dumping position, as described above.

A RESTART push button is provided in FIG. 1D, for allowing the dumping operator to override the normal spotting control, for example, to restart the automatic dump train, if desired, to remove any car which does not require dumping at the wayside dumping location; an EMERGENCY push button is provided whereby the dumping operator may cause an emergency brake application on the automatic dump train; and a CHANGE DIRECTION push button is also provided so that the dumping operator may respot any dump car which might overrun the wayside dumper WD, during automatic operation of the system. The operation of these push buttons will be described in detail hereinafter.

After the entire train has been dumped, the train is controlled, over the "normal" track switch SW of FIG. 1B. When the rear of the train clears the detector track circuit surrounding track switch SW, a stop control code is communicated to the vehicle, the track switch is automatically thrown "reverse," and, both the train and the wayside are conditioned for automatic switchback operation of the train over the reversed track switch, for its return trip along track section 8T to the mine loading location. More specifically, this conditioning of the train involves the dropping of forward relay FWD, the picking up of reverse relay REV, and a shifting of control between the vehicle carried receiver coils "A" and "B" of FIG. 2, for permitting the receiver coils 'B" to control the train operation in accordance with the coded control information then being transmitted throughout this switchback route in accordance with the traffic conditions existing along this route taken by the train during its return trip to the mine loading location.

OPERATION

Before beginning the detailed description of the operation of the selected embodiment of the present invention shown herein, the normal conditions of the system will be set forth assuming that the illustrated track layout is unoccupied and that the various circuit organizations have assumed the conditions illustrated in the accompanying drawings.

More specifically, the wayside dumper WD of FIG. 1D is normally maintained in an assumed "normal" or non-dumping position due to the energization of dumper normal relay DN by a stick circuit extending from (+), through back contact 11 of relay SCR, front contact 12 of relay DN, and to (−). The "normal" dumper position repeater relay NWP is thus also energized, to indicate that the dumper WD is in its non-dumping position, through the NORMAL contacts of dumper position indicating switch WDS, and thereby completes a normal energizing circuit for relay CAR of FIG. 1C, extending from (+) to FIG. 1D, through front contact 13 of relay NWP, back contact 14 of relay SCR, along wire 15 between FIGS. 1D and 1C, and to (−).

As previously mentioned, track relays 1TR through 4TR of FIG. 1D are normally energized by associated track batteries (not shown) to detect occupancy of the short track sections 1T through 4T of FIG. 1D, while track relay 9TR of FIG. 1B serves as an occupancy detecting relay for the detector track circuit surrounding the track switch SW of FIG. 1B. Track relay 9TR is thus normally energized by current flowing from track battery 9TB, through the rails of the detector track section 9T, and crossbonds 9CB.

Under the assumed normal conditions, the track switch SW of FIG. 1B is in its "normal" position, as illustrated, due to the energization of the NORMAL switch control wire of FIGS. 1A and 1B, as will be described hereinafter, and the normal switch correspondence relay NWC is therefore picked up to register this position of the track switch SW.

As illustrated, code repeater relay 10CP of FIG. 1A is steadily energized from (+) in FIG. 1C, through back contacts 16, 17 and 18 of relays CSR, MCR and CDR respectively, along wire 19 extending between FIGS. 1C and 1A, and to (−). The left-hand end of track section 10T is therefore steadily connected, through front contact 19a of code repeater relay 10CP, to the rectified output of an alternating current source, represented in the accompanying drawings by the symbol BX and NX. The code responsive track relay 10TP, associated with track section 10T, is therefore energized because of this STEADY code rate being applied to the left-hand end of track section 10T and registers that track section 10T is unoccupied. Similarly, track sections 8T, 6T and 5T each have an associated code responsive track relay TP for detecting occupancy of these track sections.

Home relay 9H of FIG. 1B is also picked up at this time by a circuit extending from (+) in FIG. 1A, through front contact 20 of relay 10TP, along wire 21 between FIGS. 1A and 1B, through front contact 22 of switch correspondence relay NWC, and to (−). With home relay 9H picked up, code repeater relay 9CP is connected to wire 19 through front contact 23 of relay 9H, and thereby energizes loop 9L of FIG. 1B at a STEADY code rate. Similarly, home relay 7H is normally energized through front contacts 24 and 25 of relays 9TR and NWC respectively, while home relay 6H is also normally energized through front contact 26 of relay 7TP and along wire 27 extending between FIGS. 1B and 1C; i.e., track sections 6T and 7T are also energized at STEADY code rates to pick up track relays 6TP and 7TP since the associated code repeater relays 6CP and 7CP are now being energized from wire 19 through front contacts of their associated home relays 6H and 7H respectively.

With track relays 6TP and 7TP picked up, as previously described, the home relay 5H, for track section 5T, is also picked up by a circuit extending from (+) in FIG. 1B, through front contact 28 of track relay 7TP, front contact 29 of track relay 9TR, along wire 30 between FIGS. 1B and 1C, through front contact 31 of relay 6TP, and to (−). Therefore, code repeater 5CP is also connected to wire 19 and a STEADY code rate is thus normally applied to the left-hand end of track section 5T (see FIG. 1C).

In order to permit the code rates applied to the left-hand end of track section 5T to appear throughout track section 5T, bonding wires BW are provided in the region of the wayside dumper WD (see FIG. 1D), for bridging the short track sections 1T and 4T. Thus, track relay 5TP of FIG. 1D will normally be picked up, as illustrated, due to the STEADY code rate being applied to the left-hand end of track section 5T by code repeater relay 5CP.

Connected across the right-hand end of track section 5T is decoding apparatus 32 which controls relay 270WR for purposes to be described hereinafter. Normally, relay 270WR is deenergized, and therefore, code repeater relay 1ACP is normally energized at a 37½ code rate by circuit extending from (+), through front contact 33 of code transmitter 37½CT, back contact 34 of relay 270WR, and to (−). This interrupted energization of code repeated relay 1ACP causes a 37½ code rate to be applied to the left-hand end of approach track section 1AT for causing a loaded dump train coming from the mine loading location to wait on track section 1AT until the dumping operator permits the train to enter the dumping location.

It will now be assumed that the loaded dump train of FIG. 2 is situated on track section 1AT, as represented by the dotted block V in FIG. 1D, with its locomotive L1 leading. Thus, receiver coil "A," mounted on the locomotive L1, are in control and are receiving the 37½ code rate in track 1AT due to the energization of a receiver control relay AR of FIG. 2 by a stick circuit extending from (+), through back contact 35 of receiver control relay BR, front contact 36 of relay AR, and to (−). This 37½ code rate being received by receiver coils "A" is applied along wires 37 and through front contacts 38 of relay AR as input to the train carried Receiving and Decoding Apparatus 39, so that decoding relay 37½ is energized (as shown) to close its front contact 40, for energizing the SERVICE BRAKE control wire leading to Control Apparatus 41 which causes an automatic service application of the train brakes. In addition, the forward relay FWD is energized, to control the automatic dump train in its assumed forward direction, by a circuit including front contact 42 of receiver control relay AR and back contact 43 of reverse relay REV. This picking up of the forward relay FWD causes the FORWARD control wire leading to the driving traction motors of the dump train to be energized over front contact 44 of relay FWD and back contact 45 of relay REV.

*Entrance control*

In order to permit a dump train which is stopped on track section 1AT to enter track section 5T, the dumping operator first depresses the PROCEED push button of FIG. 1D and thereby energizes relay MCR of FIG. 1C, by a circuit including contacts 46 of the PROCEED push button and wire 47 extending between FIGS. 1D and 1C. This energization of relay MCR causes a 270 code rate to be applied to the left-hand end of track section 5T due to the energizing circuit now completed for code repeater relay 5CP of FIG. 1C and extending from (+), through front contact 48 of code transmitter 270CT, front contacts 49 and 50 of relays CAR and MCR respectively, back contact 18 of relay CDR, front contact 51 of home relay 5H, and to (−). At the same time, code repeater 6CP, 7CP, 9CP and 10CP are also energized, at a 270 code rate, over wire 19 extending between FIGS. 1C and 1A.

This 270 code rate applied to track section 5T is then decoded by Decoding Apparatus 32 of FIG. 1D, for picking up relay 270WR which, in turn, causes code repeater relay 1ACP to energize the left-hand end of track section 1AT at a 270 code rate for permitting the dump train to proceed into the dumping location. More specifically, code repeater relay 1ACP is now energized through front contact 52 of code transmitter 270T and front contact 53 of relay 270WR. Referring to FIG. 2, the reception, on the train, of this 270 code rate on track section 1AT by receiver coils "A" causes decoding relay 270R to be picked up to energize the INCHING SPEED control wire leading to Control Apparatus 41, for allowing the dump train to move forward towards the dumping location at the preselected inching speed.

The dumping operator then maintains the PROCEED push button depressed until the dump train enters track section 5T and drops track relay 5TP. Thereafter, the relay MCR is maintained in its picked up position by a stick circuit including front contact 54 of relay MCR, wire 55 between FIGS. 1C and 1D, back contact 56 of relay 5TP, and the normally closed contacts 57 of the EMERGENCY push button.

*Spotting*

Assuming that the dump cars C1, C2 and C3 are of standard size, the position of these dump cars relative to the wayside dumper WD is detected by properly locating the short track sections 1T through 4T adjacent the wayside dumping location. More specifically, and with reference to the accompanying drawings, the short track section 2T is made short enough so that it can be bridged by each of the dump cars; i.e., the length of track section 2T is made less than the distance between the second and third wheels on each car (the distance TD1 in FIG. 2).

The short track section 3T which begins at the right-hand end of the wayside dumper WD is utilized to locate track section 2T relative to the wayside dumper WD and is of such length that, when a dump car is properly located for dumping at the wayside dumper WD, the second and third wheels of the following dump car will be straddling track section 2T. In this manner, the proper spotting of each dump car except the very last is accomplished.

As will be explained in detail hereinafter, the track relay 4TR, associated with track section 4T, must be dropped away before the dumper WD can be operated, to avoid operation of the dumper when the locomotive L1 is within the dumping location as shown in FIG. 3A. Therefore, the distance between the right-hand end of track section 4T and the right-hand end of track section 2T (distance WD2 in FIG. 1D) is made greater than the distance between the leading wheels on the locomotive L1 and the third wheels on the first car C1 (distance TD2 in FIG. 2). Furthermore, the distance between the right-hand end of track section 4T and the left-hand end of track section 2T (distance WD3 in FIG. 1D) is made less than the distance between the leading wheels locomotive L1 and the second wheels on the second car C2 (distance TD3 in FIG. 2), to insure that this track 4TR is dropped away when the second car C2 straddles track section 2T, as is necessary for proper dumping of car C1, to the described hereinafter.

Figure 3B:
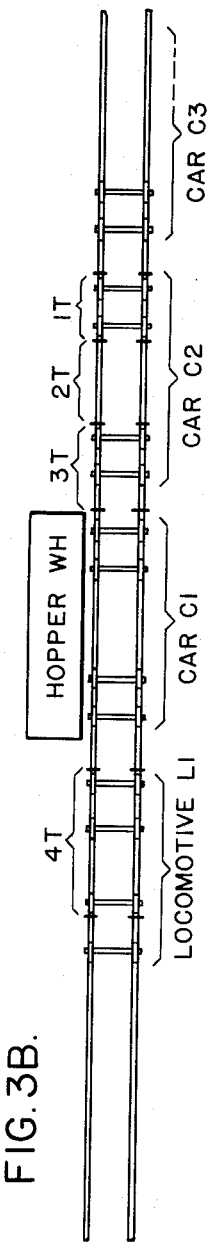

Referring now to FIGS. 3B and 1D, when the first car C1 is in the proper dumping position, the locomotive L1 occupies track section 4T and the second car C2 straddles track section 2T. Relay SCR is then energized by a circuit extending from (+), through the normally closed contacts 58 of the RESTART push button, front contact 59 of track relay 2TR, back contacts 60 and 61 of track relays 1TR and 3TR respectively, back contacts 62 and 63 of relays RWPS and 4TR respectively, and to (—). After picking up, relay SCR is then stuck in its picked up position through its own front contact 64.

This picking up of relay SCR opens back contact 14 and thereby interrupts the normal energizing circuit for relay CAR of FIG. 1C. Relay CAR is now dropped away to remove the 270 code rate from track section 5T and a 37½ code rate is then applied to the left-hand end of track section 5T, which initiates a service brake application on the train effective to stop the train with car C1 properly spotted. More specifically, code repeater relay 5CP is now energized at a 37½ code rate by a circuit including front contact 65 of code transmitter 37½ CT, back contact 66 of relay CAR, front contact 50 of relay MCR, back contact 18 of relay CDR and front contact 51 of home relay 5H.

The picking up of relay SCR furthermore completes an energizing circuit for timing relay TER of FIG. 1D extending from (+), through front contact 67 of relay SCR, back contact 68 of relay RWPS, and to (—). The timing relay TER is made slow pick up in order to allow enough time for the train to stop before the wayside dumper WD is operated to its "reverse" or dumping position. Thus, after timing relay TER picks up, dumper reverse relay DR is energized over front contact 69 of timing relay TER and causes the wayside dumper WD to be automatically operated to its dumping position, for dumping car C1.

When the wayside dumper WD reaches its fully reversed position, relay RWPS is picked up by a circuit extending from (+), through the REVERSE contacts of dumper position indicating switch WDS, front contact 70 of relay SCR, and to (—). During this reversing of the wayside dumper WD, relays DN and NWP, associated with the normal position of the dumper WD, are obviously dropped away.

With the relay RWPS picked up, indicating that the wayside dumper WD has been fully reversed, or in other words, operated to its maximum dumping position, the relay DN is now energized to automatically return the dumper WD to its "normal" or non-dumping position by circuit including front contact 67 of relay SCR and front contact 71 of relay RWPS. This operation of the wayside dumper WD to its "normal" position causes energization of relay NWP, as previously described, and furthermore, the relay RWPS remains picked up by a stick circuit including its own front contact 72 and front contact 70 of relay SCR.

Relay CAR of FIG. 1C is once again energized, for reapplying or retransmitting a 270 code rate to track section 5T, by a circuit including front contact 13 of relay NWP, front contact 73 of relay RWPS and wire 15 between FIGS. 1D and 1C. This 270 code rate applied to the left-hand end of track section 5T now causes the dump train to move forward (from right to left in the drawings) at its nominal inching speed. Thus, the closing of front contact 13 of relay NWP is required before the proceed code is again transmitted to the vehicle, and, in this sense, relay NWP returning to its picked up position determines the end of the spotting time interval for the car just dumped. This alternate stopping and starting of the dump train, by selectively energizing the left-hand end of track section 5T with stop and proceed control code rates, then continues until each of the cars of the dump train have been properly spotted and dumped at the wayside dumping location.

When the third wheels of the second car C2 shunt track section 2T, so as to drop track relay 2TR, the stick circuit for relay SCR is interrupted at front contact 59 of track relay 2TR, and, relay SCR therefore drops away and opens front contact 70 in the stick circuit for relay RWPS. It will be noted that relay RWPS is made slow releasing in order to keep its front contact 73 closed until back contact 14 of relay SCR closes and thereby prevents interruption in the energizing circuit for relay CAR of FIG. 1C.

Figure 3C:
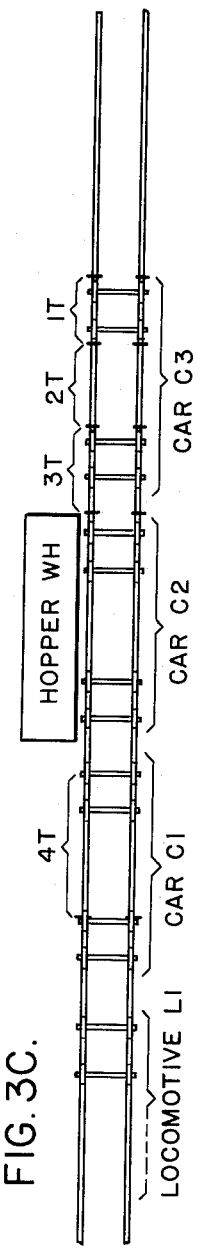

Referring now to FIG. 3C, when the dump train has progressed so that car C3 straddles track section 2T, the second car C2 is properly positioned over wayside dumper WD. Relay SCR is then picked up to drop relay CAR which removes the 270 inching code rate from track section 5T and a service brake control code rate (37½ code rate) is once again applied to the left-hand end of track section 5T, as discussed above, until the second car C2 is dumped, at which time relay CAR is again picked up for reapplying a 270 code rate to track section 5T which moves the train ahead for spotting the third car C3.

Figure 3D:
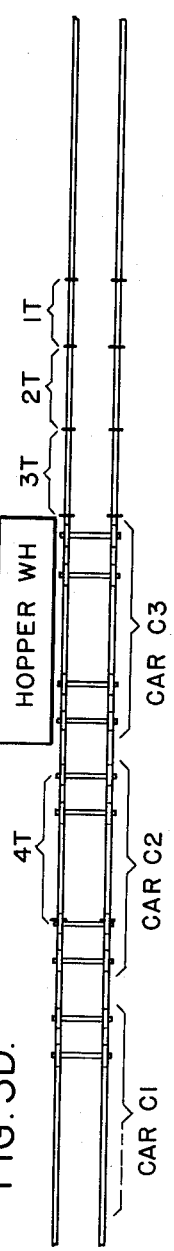

The operation for spotting the last car C3 in the dump train is somewhat different from that previously set forth for cars C1 and C2 and will now be discussed. Referring to FIG. 3D, the car C3 is in the proper position for stopping, relative to wayside dumper WD, as soon as it clears track section 3T. Thus, with track sections 1T, 2T and 3T clear, relay SCR is now energized over front contacts 74 and 75 of relays 1TR and 3TR respectively, to drop relay CAR for communicating a 37½ service brake code rate to the dump train.

Although the foregoing description was concerned with a dump train having only three dump cars, it should be understood at this time that longer trains may also be required to utilize the illustrated track layout, and therefore, the alternate stop and proceed code rates applied to the track section 5T as discussed above, for successively spotting the individual dump cars, are simultaneously applied to the left-hand ends of track sections 6T, 7T and 10T and also to the loop circuit 9L, assuming of course that only one dump train is within the dumping area.

Referring now to FIG. 1D, a RESTART push button is provided whereby the dumping operator may deenergize relay SCR, to pick up relay CAR for the purpose of applying a 270 code rate in the illustrated track layout to restart the dump train if the car then spotted at the wayside dumping location does not require dumping. More specifically, by depressing the RESTART push button, the operator can at any time interrupt (at contacts 58) the above-mentioned energizing circuits for relay SCR, to thereby drop relay SCR and cause energization of relay CAR for the purpose of applying the proceed 270 code rate in the illustrated track layout. In this manner, actuation of the RESTART push button overrides the normal control of the relay SCR discussed above when considering normal spotting of a car for dumping, and thus, permits either moving a car past the wayside dumping location without stopping, or, restarting the dump train if a car then spotted at the dumper WD does not require dumping. Obviously, however, the relay CAR cannot be picked up while the wayside dumper WD is dumping, as evidenced by the relay NWP being deenergized; i.e., front contact 13 is open. Furthermore, an EMERGENCY push button is also provided in FIG. 1D whereby the dumping operator may drop relay MCR, to cause code repeater relay 5CP to be steadily energized over the previously described energized circuit including back contact 17 of relay MCR. Referring to FIG. 2, the reception of the STEADY code rate on the automatic dump train causes an emergency of the train brakes, due to the picking up of emergency brake relay EMR and the resulting energization of the EMERGENCY BRAKE control wire connected to the Control Apparatus 41.

A CHANGE DIRECTION push button is provided in FIG. 1D for permitting the dumping operator to respot any car which overruns the wayside dumper WD, during automatic operation of the system. The depression of the CHANGE DIRECTION push button completes the energizing circuit for relay CDR, of FIG. 1C, including contacts 76 of the push button and wire 77 between FIGS. 1D and 1C. As long as relay CDR is picked up, a 1.0 KC signal and a 270 code rate are simultaneously applied to the left-hand end of track section 5T. More specifically, with relay CDR picked up, code repeater relay 5CP is energized at a 270 rate through front contact 78 of relay CDR, while the 1.0 KC signal is applied to track section 5T over back contact 79 of code repeater relay 5CP, front contacts 79a of relay CDR, and wires 80.

Referring to FIG. 2 of the accompanying drawings, the simultaneous reception of the 270 code rate and the 1.0 KC signal calls for a reverse inching operation of the illustrated automatic dump train (from left to right in the drawings). More specifically the reverse relay REV is now picked up, to call for reverse travel of the dump train, over front contacts 81, 82 and 83 of relays AR, 1.0 KC and 270R respectively, as long as the CHANGE DIRECTION push button of FIG. 1D is held in a depressed position. Obviously, forward relay FWD is dropped away due to the opening of back contact 43 of reverse relay REV, and therefore, the REVERSE control wire is energized over back contact 84 of relay FWD and front contact 85 of relay REV. However, as soon as the car in question is properly spotted, the CHANGE DIRECTION push button is released to drop relay CDR, and the 1.0 KC signal is removed from track section 5T. When this occurs, reverse relay REV is dropped away and forward relay FWD is once again picked up to energize the FORWARD control wire of FIG. 2.

*Switchback operation*

Assuming now that all cars in the dump train have been dumped, as described above, that the dumper WD has returned to its "normal" position, and that a proceed control code (270 code rate) is being applied to wire 19 of FIGS. 1A through 1C, the train then progresses from right to left in the drawings, towards track section 10T. When the locomotive L1 enters detector track section 9T, track relay 9TR is dropped away to open its front contact 86, for preventing any operation of the track switch SW while the detector track section is occupied.

In the illustrated embodiment of the present invention, it is assumed that the trains utilizing the illustrated track layout are long enough to simultaneously deenergize relays 5TP and 9TR, so that the relay MCR can be maintained in a picked up position during the dumping operation and until the train is clear of the track switch SW, by a stick circuit including wire 87 between FIGS. 1C and 1B, back contact 88 of relay 9TR, front contact 89 of switch correspondence relay NWC and wire 90 between FIGS. 1B and 1D, this stick circuit being connected in multiple with back contact 56 of relay 5TP.

Referring to the accompanying drawings, it will be noted that as long as the dump train occupies track section 6T, 7T or 9T, home relay 5H is dropped away and thereby causes code repeater relay 5CP of FIG. 1C to be steadily energized through back contact 91 of relay 5H. This then causes track section 5T to be energized at a "STEADY" code rate for picking up track relay 5TP when the track section 5T becomes unoccupied. Obviously, however, any dump train waiting on approach track section 1AT is not permitted to enter the dumping location until relay 270WB is again picked up, as will be described.

Referring to FIG. 1A, as soon as the train enters track section 10T, track relay 10TP drops away and causes a 37½ code rate to be applied to the right-hand end of the track section 10T, due to the 37½ code rate energization of code repeater relay 10ACP over a circuit including front contact 92 of code transmitter 37½ CT and back contacts 93 and 94 of relays 10TP and 10AH, respectively. Obviously, since the "A" receiver coils are in control, and are receiving a 270 code rate, the train continues to the left on track section 10T until it clears the detector track section of FIG. 1B, so as to pick up track relay 9TR.

When relay 9TR picks up, to indicate that the train has cleared the track switch SW, relay CSR of FIG. 1C is now energized by circuit extending from (+) in FIG. 1A, through back contact 95 of track relay 10TP, wire 96 between FIGS. 1A and 1B, front contact 97 of track relay 9TR, wire 98 between FIGS. 1B and 1C, back contact 99 of timer repeater relay TEP, and to (—). This picking up of relay CSR then causes a 1.7 KC signal to be applied to the left-hand end of track section 10T, through front contacts 100 of relay CSR, back contacts 101 of relay CDR, along wires 102 between FIGS. 1C and 1A, and through back contact 102a of code repeater relay 10CP which is now dropped away due to the opening of back contact 16 of relay CSR.

With reference to FIG. 2, the reception by receiver coils "A," of this 1.7 KC signal, causes receiver control relay BR to be energized by a circuit including front contact 103 of relay 1.7 KCR, for connecting the receiver coils "B," at the rear of the train, to the Receiving and Decoding apparatus 39. More specifically, receiver coils "B" are now connected to supply message inputs to the Receiving and Decoding apparatus 39 over front contacts 104 of relay BR. In addition, the picking up of relay BR causes relay AR to be dropped away, due to the opening of back contact 35 of relay BR, in the stick circuit for relay AR, and subsequently, relay BR is provided with a stick circuit including its own front contact 105 and back contact 106 of relay AR.

With relay AR dropped away and relay BR picked up, the forward relay FWD is dropped away by the opening of front contact 42 of relay AR and the reverse relay REV is subsequently picked up, over front contact 107 of relay BR and back contact 108 of relay FWD, to energize the REVERSE control wire of FIG. 2 for operating the train in a reverse direction in accordance with the coded control information subsequently received. As previously mentioned, a 37½ code is now being applied to the right-hand end of track section 10T, and therefore, a service application of the train brakes is initiated.

With reference to FIG. 2 of the drawings, the relay REV is provided with a second or alternate pick up circuit, previously discussed, including front contacts 81, 82 and 83 of relays AR, 1.0KCR and 270R respectively, whereby the automated dump train can be controlled to travel in its assumed reverse direction under the control of the "A" receiver coils. This alternate energizing circuit for relay REV has been previously discussed in connection with the respotting of a dump car which overruns the wayside dumper WD shown in FIG. 1D, but, has utility wherever it is desirable to operate the train in its reverse direction, in accordance with controls received at the "A" receiver coils; e.g. at the entrance to the mine loading location it may be desirable to reverse the receiving ends from the "B" to the "A" receiver coils as the automated dump train is about to back into the mine entrance, by communication of the proper coded control message to the vehicle, and thereby retain control over the train without requiring installation of communication apparatus within the mine loading location. Inspection of FIG. 2 will furthermore reveal that the forward relay FWD is also provided with a pair of energizing circuits, the first of which (including back contact 43 of relay REV and front contact 42 of relay AR) is utilized to normally maintain the relay FWD picked up while the automated dump train is travelling in its forward direction with the "A" receiver coils in control; whereas, the alternate energizing circuit for this relay FWD would be utilized, for example, whenever the automated train is desired to operate in its forward direction under the control of the coded messages received at receiver coils "B."

Referring to FIG. 1C, the energization of relay CSR causes its front contact 109 to close for energizing wayside timer T1 which times the application of this 1.7KC signal to the track section 10T; i.e., allows the train carried apparatus sufficient time within which to condition itself, as previously discussed, for the opposite direction of travel. Assuming that the timer T1 now closes its contact 110, the energizing circuit for timer repeater relay TEP is completed extending from (+) in FIG. 1A, through back contact 111 of track relay 10TP, along wire 112 between FIGS. 1A and 1C, through front contact 110 of timer T1, and to (—). With relay TEP now picked up and its back contact 99 open, relay CSR is dropped away to remove the 1.7 KC signal from track section 10T due to the opening of front contacts 100, and also resets the timer T1 due to the opening of front contact 109. With timer T1 reset, timer repeater relay TEP is now maintained in a picked up position by a stick circuit including its own front contact 113.

Referring to FIGS. 1A and 1B, when the rear of the dump train clears the detector track section 9T, as previously described, so as to pick up the track relay 9TR, relay MCR of FIG. 1C is now dropped away due to opening of back contact 88 of track relay 9TR. In order to prevent an emergency brake application on the train while the receiver coils "A" are still in control, the dropping away time of relay MCR is made somewhat longer than the pick up time of relay CSR.

Furthermore, the picking up of detector track relay 9TR also completes the previously described energizing circuit for home relay 5H of FIG. 1C, including front contacts 28, 29 and 31 of relays 7TP, 9TR and 6TP, respectively. However, this home relay 5H is made slow pick up to insure that the relay MCR drops away before the home relay 5H is picked up. This slow pick up of home relay 5H thus insures that only one dump train can enter the wayside dumping location for each operation of the PROCEED push button of FIG. 1D; i.e., the PROCEED push button must now be depressed for energizing code repeater relay 5CP at a 270 code rate, if it is desired to permit a second dump train to enter the dumping location.

With further reference to FIGS. 1A and 1B, when detector track relay 9TR picks up, indicating that the train has cleared the track switch SW, the REVERSE switch control wire of FIGS. 1A and 1B is now energized to operate the switch to its "reverse" position by a circuit extending from (+) in FIG. 1B, through front contact 86 of track relay 9TR, along wire 114 between FIGS. 1B and 1A, and through back contact 115 of track relay 10TP. With the switch SW reversed, normal switch correspondence NWC is dropped away and reverse switch correspondence relay RWC is now picked up and causes a 120 code rate (medium speed code) to be applied to the right-hand end of track section 10T and to loop 9AL of FIG. 1B.

More specifically, the picking up of switch correspondence relay RWC completes the energizing circuit for home relay 10AH, of FIG. 1A, extending from (+) in FIG. 1B, through front contact 116 of relay 8TP which checks that track section 8T is unoccupied, front contact 117 of switch correspondence relay RWC, front contact 118 of track relay 9TR, along wire 119 between FIGS. 1B and 1A, back contact 120 of track relay 10TP, and to (—). This in turn causes code repeater relay 10ACP to be energized at a 120 code rate by a circuit including front contact 121 of code transmitter 120CT and front contact 122 of relay 10AH. Similarly, home relay 9AH of FIG. 1B is now energized by a circuit including front contact 123 of track relay 8TP and front contact 124 of switch correspondence relay RWC, so that code repeater relay 9ACP is also energized at a 120 code rate by a circuit including front contact 125 of code transmitter 120CT and front contact 126 of home relay 9AH. In the foregoing, it has been assumed that track relay 8TP of FIG. 1B is picked up due to the coding of track section 8T, by suitable coding apparatus (shown in block form), in accordance with traffic conditions existing in advance, or to the right, of track section 8T.

Referring to FIG. 2, the reception of this 120 code rate, by receiver coils "B," causes energization of the MEDIUM SPEED control wire so that the empty dump train now proceeds at its nominal medium speed over the track switch SW in its "reverse" position on its return trip to the mine loading location.

After the empty dump train clears detector track section 9T, and is on track section 8T, the track switch SW is automatically returned to its "normal" position by completion of a circuit extending from (+) in FIG. 1B, through front contact 86 of track relay 9TR, along wire 114 between FIGS. 1B and 1A, through front contact 127 of track relay 10TP, to the NORMAL switch control wire extending between FIGS. 1A and 1B.

CONTROL OF SECOND DUMP TRAIN

As previously mentioned, when the dump train previously discussed clears the detector track section 9T, onto track section 10T, relay MCR is dropped away and home relay 5H is picked up a short time later.

If the dumping operator now depresses the PROCEED push button of FIG. 1D, relay MCR will be picked up, over contacts 46 of the PROCEED push button, to apply a 270 code rate to the left-hand end of track section 5T, as previously described, for permitting a second dump train to enter the dumping location. The cars of the second dump train will then be successively spotted and dumped as previously set forth.

However, it will be noted in FIGS. 1B and 1C that with a first train occupying either track section 9T or 10T, the home relays 7H and 6H are both denergized for applying a STEADY and a 37½ code rate to left-hand ends of track sections 7T and 6T respectively. This is to prevent a second train, upon entering the dumping area, from advancing too far in the illustrated track layout, until the first dump train has completed its automatic switchback operation; the second dump train will receive a service brake application when it enters track section 6T.

With reference to FIG. 1B, it will be noted that front contact 128 of reverse switch correspondence relay RWC is connected in multiple with front contact 29 of track relay 9TR, in the energizing circuit for home relay 5H. This allows home relay 5H to be maintained in its picked up position, for permitting the entrance of a second dump train into the wayside dumping location, during the switchback operation of a preceding dump train.

During the switchback operation of the first dump train, it is necessary that loop circuit 9L be uncoded, to prevent reception of the first train of control information intended only for the second dump train, and therefore, with switch correspondence relay NWC dropped away, during the switchback operation, the code repeater 9CT is dropped away due to the opening of front contact 23 of home relay 9H, and furthermore the loop circuit 9L is disconnected from the 1.0 KC source due to the opening in front contact 129 of home relay 9H. However, the 1.0 KC signal together with the 270 code rate can be applied to the left-hand end of track section 5T for respotting the cars of the second dump train when necessary.

From the above discussion, it is apparent that a control system has thus been provided by the present invention which automatically controls the alternate stopping and starting of railway vehicles at a predetermined wayside location, such as, a mine dumping location, and which furthermore provides for the automatic switchback operation of the trains after such alternate stopping and starting, so that an empty dump train, for example, may be automatically returned to the mine loading location. However, although the foregoing discussion is primarily concerned with automatic control of a railway dump train during mine operation, it should be understood that the system of the present invention might also be utilized in other railway operations, for example, for controlling the spotting of passenger cars at a station platform.

Having thus described one specific embodiment of the present invention, it should be understood at this time that this form is selected to facilitate in the disclosure of the invention rather than to limit the number of forms which it may assume; and it should be further understood that various modifications, adaptation and alterations may be applied to the specific form shown without in any manner departing from the spirit or scope of the present invention.

What we claim is:

1. A system for governing the alternate stopping and starting of a railway train at a predetermined location at which the cars of said train are to be successively spotted for a predetermined time interval comprising,
    (a) means for detecting when each successive car to be spotted is substantially in proper spotting position adjacent said location,
    (b) first control means responsive to the condition of said detecting means effective to cause the stopping of said train each time a car to be spotted is substantially in said proper spotting position,
    (c) registering means for registering the completion of of said predetermined time interval for each car stopped in said spotting position adjacent said location, and
    (d) second control means responsive to the condition of said registering means effective to cause the starting of said train subsequent to the completion of said predetermined time interval for each car.

2. The system according to claim 1 wherein said detecting means is effective to distinguish between the locomotive of said train and the connected cars to prevent a stopping of said train when said locomotive is adjacent said predetermined location.

3. The system according to claim 1, including manually operated means for starting said train when the car adjacent said predetermined location is not desired to be spotted.

4. The system according to claim 1, including means for starting said train in a reverse direction when a car to be spotted overruns the proper spotting position at said predetermined location.

5. In a system for governing the alternate stopping and starting of a railway train at a predetermined location at which the cars of said train are to be successively spotted for a predetermined time interval, the driving motor and brake mechanisms of said railway train being operated in accordance with coded control information communicated to the train from the wayside, the combination of,
    (a) means for detecting when each of the cars to be spotted is substantially in proper spotting position adjacent said location,
    (b) first wayside means responsive to the condition of said detecting means for communicating a stop control code to said train each time a car to be spotted is substantially in said proper spotting position,
    (c) registering means for registering the completion of said predetermined time interval for each car stopped in said spotting position adjacent said location, and
    (d) second wayside means responsive to the condition of said registering means for communicating a proceed control code to said train subsequent to the completion of said predetermined time interval for each car.

6. A system according to claim 5 wherein said coded control information is in the form of current pulse rate codes communicated from the wayside to said train via the track rails.

7. In a control system for governing the operation of a railway train having its driving motor and brake mechanisms selectively operated and its direction of travel selected in accordance with coded control information communicated to the train from the wayside during the shuttle operation of said train between first and second wayside locations, a train approaching said first location being required to be alternately stopped and started, for successively spotting the cars of said train at said first location for a predetermined time interval, the combination of,
    (a) first detecting means for detecting when each of the cars to be spotted is substantially in proper spotting position adjacent said first location, (b) first wayside means responsive to the condition of said first detecting means for communicating a stop control code to said train each time a car to be spotted is substantially in said spotting position, (c) registering means for registering the completion of said predetermined time interval for each car to be spotted, (d) second wayside means responsive to the condition of said registering means for communicating a proceed control code to said train subsequent to the completion of said predetermined time interval for each car, (e) a two position track switch beyond said first location over which a switching back operation of said train is to be performed after said successive car spotting for the return trip of the train to said second location, (f) second detecting means for detecting when said train clears said switch in a first position, said train being permitted to move over said switch only provided that said proceed control code is communicated thereto, (g) switch control means responsive to said second detection means for reversing said switch to its second position to align the route for said return trip when said train clears said switch, (h) means responsive to said second detecting means for communicating distinctive coded control information to said train effective to condition said train for the opposite direction of travel, and (i) means responsive to the reversing of said switch for communicating coded control information to said train effective to operate the train back over said reversed switch in accordance with traffic conditions existing along said return trip route.

8. In a control system for governing the operation of a railway dump train having its driving motor and brake mechanisms selectively operated and its direction of travel selected in accordance with coded control information communicated to the train from the wayside during shuttle operation of said dump train between a dumping location and a loading location, a train approaching said dumping location being required to be alternately stopped and started for successively spotting each car of said dump train at said dumping location, the combination of, (a) first detecting means for detecting when each of the cars to be spotted is substantially in proper spotting position adjacent said dumping location, (b) first wayside means responsive to the condition of said first detecting means for communicating a stop control code to said train each time a car to be spotted is substantially in said proper spotting position, (c) means effective when said train is stopped for dumping the car then spotted at said dumping location, (d) registering means for registering the completion of the dumping time interval for each car, (e) second wayside means responsive to the condition of said registering means for communicating a proceed control code to said dump train after each car has been dumped, (f) a two position track switch beyond said dumping location over which a switching back operation of said dump train is to be performed after the dumping of said cars for the return trip of said train to said loading location, (g) second detecting means for detecting when said train clears said switch in a first position, said train being permitted to move over said switch only provided that said proceed control code is communicated thereto, (h) switch control means responsive to said second detection means for reversing said switch to its second position to align the route for said return trip when said train clears said switch, (i) means responsive to said second detecting means for communicating distinctive coded control information to said train effective to condition said train for said return trip, and (j) means effective when switch is reversed for communicating coded control information to said train effective to operate said train back over said reversed switch in accordance with the traffic condition existing along said return trip route.

9. In a control system for governing the switching back operation of a railway train in a track layout made up of first and second stretches of track diverging through a two position track switch into a third stretch of track, the operation of said train being controlled in accordance with coded control information communicated from the wayside to the train, the combination of, (a) means for communicating a proceed code to the train effective to permit movement of the train from said first stretch of track onto said third stretch of track over said switch in a first position, (b) means for detecting when said train has cleared said switch onto said third stretch of track, (c) means responsive to the condition of said detecting means for reversing said switch to its second position to align a switchback route for said train onto said second stretch of track, (d) means responsive to the condition of said detecting means for communicating a stop code to the train after said train has cleared said switch in said first position effective to control said train to stop, and (e) means responsive to the reversing of said switch for communicating a proceed code to said train effective to permit movement of said train back over said reversed track switch onto said second stretch of track in accordance with traffic conditions existing along said switchback route.

10. In a control system for governing the switching back operation of a railway train in a track layout made up of first and second stretches of track diverging through a two position track switch into a third stretch of track, the operation of said train being controlled in accordance with received current pulse rate codes transmitted along the track from in advanced of the train and selected in accordance with advance traffic conditions, the combination of, (a) a receiving means on each end of said train for receiving said transmitted current pulse rate codes, (b) a detector track circuit surrounding track switch and having a first portion extending through said track switch in a first position over which said train is to operate during movement from said first stretch of track onto said third stretch of track and having a second portion extending through said track switch in its second position over which said train is to operate during switchback movement from said third stretch of track onto said second stretch of track, (c) a first wayside loop circuit disposed throughout the length of the first portion of said detector track circuit, (d) a second wayside loop circuit disposed throughout the length of the second portion of said detector track circuit, (e) first communicating means including said first loop circuit and a first of said receiving means for communicating a proceed pulse rate code from the wayside to said train effective to permit movement of the train over said track switch in said first position, (f) switch reversing means responsive to the occupancy of said detector track circuit for reversing said track switch to its second position after said train vacates said detector track circuit, (g) receiver selection means responsive to the occupancy of said detector track circuit for rendering only the other of said receiving means effective to receive said pulse rate codes on the train after said train vacates said detector track circuit, and (h) second communicating means including said second loop circuit and said effective receiving means for communicating a proceed pulse rate code to said train effective to permit movement of the train back over said track switch in its second position.

11. The combination specified in claim 10 wherein said first and second loop circuits are selectively render effective to communicate said pulse rate codes in accordance with the position of said track switch.

12. In a control system for governing the switching back operation of a railway train in a track layout made up of first and second stretches of track diverging through a two position track switch into a third stretch of track, the throttle and brake mechanism of said train being selectively operated and the direction of travel of said train selected in accordance with coded control information communicated from the wayside to the train, the combination of, (a) means for communicating coded control information to the train effective to operate the train from said first stretch of track onto said third stretch of track over said switch in a first position, (b) means for detecting when said train has cleared said switch onto said third stretch of track, (c) means responsive to the condition of said detecting means for reversing said switch to its second position to align a switchback route for said train onto said second stretch of track, (d) direction reversing means responsive to the condition of said detecting means for communicating coded control information to the train after said train has cleared said switch in said first position effective to stop said railway train and condition it for the opposite direction of travel, and (e) means responsive to the reversing of said switch for communicating coded control information to said train effective to operate the train back over said reversed track switch in accordance with traffic conditions existing along said switchback route.

13. In a control system for governing the operation of an automated railway dump train equipped with a driving motor and brake mechanisms in a track layout including a dumping location at which the loaded cars of said train when approaching said dumping location from a distant loading location are to be successively spotted and dumped and a two position track switch disposed beyond said dumping location over which said train is to be switched back for a return trip towards said distant loading location subsequent to the dumping of the cars of said train, the combination of, (a) wayside transmitting means including the rails of said track layout effective to transmit predetermined control messages to said train indicative of the desired operation of said train within said track layout, said control messages being transmitted through said track rails towards one end or the other of said train, (b) control message receiving means at each end of said dump train for receiving the control messages transmitted thereto, (c) operation control means on said dump train for controlling the driving motor and brake mechanisms of said train in accordance with the received control messages when supplied as inputs thereto so as to cause said train to operate as desired within said track layout and including (1) directional means operative to register the desired direction of travel for said dump train, and (2) receiver selecting means operative to selectively render one or the other of said receiving means only effective to supply said control message inputs to said operation control means, the receiving means on the leading end of said train when approaching said dumping location being effective to supply said control message inputs to said operation control means, (d) a dumper mechanism operative to dumping and non-dumping conditions for successively dumping the loaded cars of said dump train, (e) first communication control means responsive to the condition of said dumper mechanism for causing said wayside transmitting means to transmit a first control message towards said effective receiver means indicating that said approaching train is desired to proceed in said track layout in a first direction such that its loaded cars successively pass said dumper mechanism, (f) first detecting means for detecting the location of each car of said train relative to a predetermined proper spotting position at said dumping location, (g) second communication control means responsive to said first detecting means for causing said wayside transmitting means to transmit a second control message towards said effective receiver means indicating that said dump train is desired to stop when a car to be dumped is substantially in proper spotting position at said dumping location, the reception of said second control message at said leading end receiver means causing said operation control means to stop said train, (h) dumper control means responsive to the stopping of a car in said proper spotting position for operating said dumper mechanism through an operating cycle involving movement from its non-dumping condition to its dumping condition and back to its non-dumping condition so as to dump said spotted car, (i) third communication control means for causing said wayside transmitting means to transmit a third control message towards said effective receiver means indicating that said dump train is desired to back up until a car that has overrun said proper spotting position has returned to said spotting position, the reception of said third control message at said effective receiver means causing operation of said directional means to reverse the direction of travel of said dump train while at the same time maintaining the same receiver means effective.

(j) second detecting means responsive to the completion of the operating cycle of said dumper mechanism for rendering said first communication control means effective to cause retransmission of said first control message to said dump train, whereby said train is permitted to travel over said track switch in a first of its two positions only provided that said effective receiver means is receiving said first control message, (k) third detecting means for detecting when said train has cleared said track switch in said first position, (l) fourth communication control means responsive to said third detecting means for causing said wayside transmitting means to transmit a fourth control message to said effective receiver means when said train clears said track switch indicating that said train is desired to be conditioned for the opposite direction of travel, the reception of said fourth control message at said effective receiver means causing operation of said directional means to reverse the direction of travel of said dump train and also operation of said receiver selecting means to render the receiver means to the opposite train end thereafter only effective to supply said control message inputs to said operation control means, (m) switch operating means responsive to said third detecting means effective to operate said track switch to its other position after said train clears said switch in said first position, and (n) fifth communication control means rendered effective only after said track switch has been operated to said other position for causing said wayside transmitting means to transmit a fifth control message to the now effective receiver means at said opposite train end indicating that said train is desired to move back over its track switch in its said other position for its return trip to said distant loading location.

14. In a system for remotely controlling a vehicle equipped with a control message receiving means at each end thereof along a stretch of right of way, the combination of, (a) wayside transmitting means for transmitting predetermined control messages to said vehicle distinctive of the desired operation of said vehicle on said right of way, (b) control means on said vehicle for controlling said vehicle to operate in accordance with received control messages when supplied as inputs thereto and including
 (1) directional means for registering the desired direction of travel for said vehicle, and
 (2) receiver selecting means for selectively rendering one or the other of said control message receiving means only effective to supply said control message inputs to said control means, and (c) means responsive to the reception at said effective receiver means of a particular predetermined control message while said directional means is registering a first desired direction of travel for actuating said receiver selecting means to render only the other of said receiving means subsequently effective to supply said control message inputs to said control means while at the same time maintaining said first desired direction of travel registration by said directional means.

15. In a system for remotely controlling a vehicle equipped with control message receiving means at each end thereof to operate in opposite directions along a stretch of right of way, the combination of, (a) wayside transmitting means for transmitting predetermined control messages to said vehicle distinctive of the desired operation of said vehicle on said right of way, (b) control means on said vehicle for controlling said vehicle to operate in accordance with received control messages when supplied as inputs and including
 (1) directional control means for selecting the direction of travel of said vehicle and
 (2) receiver selecting means for selectively rendering one or the other of said receiving means only effective to supply said control message inputs to said control means, (c) first actuation means responsive to the reception at the effective receiving means of a first predetermined control message for causing the actuation of said directional control means to reverse the direction of travel of said vehicle while maintaining the same effective receiving means and thereby cause said vehicle to subsequently operate in said reverse direction in accordance with the control messages received at said same effective receiver means, and (d) second actuating means responsive to the reception at said effective receiver means of a second predetermined control message for causing the actuation of said directional control means to reverse the direction of travel of said vehicle and also the actuation of said receiver selecting means to subsequently render only the other of said receiving means effective to supply said control message input to said control means and thereby cause said vehicle to subsequently operate in said reverse direction in accordance with the control messages received at said other now effective receiver means, (e) whereby said vehicle can be remotely controlled to reverse its direction of travel either with or without reversing said receiver means in accordance respectively with whether said first or said second predetermined control message is received on said vehicle.

16. A system for governing the stopping and starting of a railway train comprising a plurality of connected cars at a predetermined location along a stretch of track at which at least one of the cars of the train is to be temporarily spotted for performance of a desired operation, each of the cars having a pair of spaced axes, the system comprising:

(a) means for detecting when each car to be spotted is substantially in proper spotting position adjacent said location, (b) said detecting means comprising a short track circuit having a length less than the distance between the spaced axles on a car and being disposed along said track relative to said predetermined location such that said short track circuit is unoccupied whenever a car of said train is substantially in said proper spotting position, (c) first control means responsive to the condition of said detecting means effective to control the train to stop each time a car to be spotted is substantially in said spotting position, (d) registering means for registering the completion of said operation for each car stopped in said stopping position, and (e) second control means responsive to the condition of said registering means effective to control said train to start subsequent to the completion of said operation for each spotted car.

17. A system for governing the stopping and starting of a railway train comprising a plurality of connected cars drawn by a locomotive at a predetermined location along a stretch of track at which at least one of the cars of said train is to be temporarily spotted for performance of a desired operation, said system comprising:

(a) means for detecting when each car to be spotted is substantially in proper spotting position adjacent said location, (b) said detecting means including a locomotive detecting track circuit having an entrance end located beyond the spotting position for detecting when the locomotive is beyond the spotting position, the entrance end of the locomotive detecting track circuit being displaced from the spotting position by a distance such that the locomotive first occupies the locomotive detecting track circuit when the first car to be spotted is substantially in proper spotting position, (c) first control means responsive to the condition of said detecting means effective to control the locomotive to stop each time a car to be spotted is substantially in said proper stopping position, (d) said control means being rendered effective to control the locomotive to stop the train for spotting a car only after the locomotive detecting track circuit has been occupied by the locomotive to indicate that the locomotive is then beyond the spotting position, (e) registering means for registering the completion of the operation for each car stopped in said stopping position, and (f) second control means responsive to the condition of the registering means effective to control the locomotive to start the train subsequent to the completion of the operation for each spotted car.

References Cited by the Examiner

UNITED STATES PATENTS

| | | | |
|---|---|---|---|
| 1,237,287 | 8/17 | Boemper | 104—149 |
| 1,544,988 | 7/25 | Hutton | 214—55 |
| 2,317,333 | 4/43 | Schlienger. | |

(Other references on following page)

UNITED STATES PATENTS

| | | | |
|---|---|---|---|
| 2,386,956 | 10/45 | Klampetal | 104—149 |
| 2,511,760 | 6/50 | Allen | 246—160 |
| 2,529,804 | 11/50 | Harnischfeger. | |
| 2,617,546 | 11/52 | Rosener | 214—44 |
| 2,659,498 | 11/53 | McCarthy. | |
| 2,742,563 | 4/56 | Hoogerhyde | 246—160 |
| 2,958,330 | 11/60 | Huenerfauth | 104—149 X |
| 3,038,066 | 6/62 | Barry. | |
| 3,041,448 | 6/62 | Pascoe et al. | 246—63 |
| 3,045,112 | 7/62 | Hailes. | |
| 3,049,247 | 8/62 | Lemelson | 214—16.42 |
| 3,054,890 | 9/62 | Livingston | 246—134 |
| 3,128,070 | 4/64 | Harris et al. | |
| 3,146,728 | 9/64 | Doorley | 104—162 |

GERALD M. FORLENZA, *Primary Examiner.*

LEO QUACKENBUSH, HUGO O. SCHULZ,
*Examiners.*